United States Patent [19]

Cowell et al.

[11] 3,905,947
[45] Sept. 16, 1975

[54] ORGANO-NICKEL SALTS AS ADHESION PROMOTORS FOR VULCANIZABLE ELASTOMERS TO METALS

[75] Inventors: George K. Cowell, Brunswick, Ohio; David J. Cherry, Somers; William J. Considine, Pearl River, both of N.Y.

[73] Assignee: Ciba-Geigy Corporation, Ardsley, N.Y.

[22] Filed: Oct. 10, 1973

[21] Appl. No.: 404,971

[52] U.S. Cl..... 260/79.5 R; 117/132 C; 117/132 R; 156/110 A; 156/124; 156/327; 156/338; 260/79.5 P; 260/775
[51] Int. Cl.² .......................... C09J 3/12; C09J 3/14
[58] Field of Search ... 260/79.5 R, 79.5 P, 45.75 N, 260/775; 156/110 A, 124, 338, 327; 117/132 C, 132 R

[56] References Cited
UNITED STATES PATENTS

| | | | |
|---|---|---|---|
| 2,643,273 | 6/1953 | Wilkins | 117/128.7 |
| 2,912,355 | 11/1959 | Formanek et al. | 156/110 A |
| 3,189,630 | 6/1965 | Smutny | 260/45.75 R |
| 3,310,575 | 3/1967 | Spivack | 260/45.75 R |
| 3,488,368 | 1/1970 | Spivack | 260/45.75 R |
| 3,497,464 | 2/1970 | Monroe et al. | 156/327 |
| 3,723,489 | 3/1973 | Dexter et al. | 260/45.85 S |

FOREIGN PATENTS OR APPLICATIONS

| | | | |
|---|---|---|---|
| 943,081 | 11/1963 | United Kingdom | 260/45.75 N |
| 2,251,318 | 4/1973 | Germany | 156/327 |

Primary Examiner—Ronald W. Griffin
Attorney, Agent, or Firm—Charles W. Vanecek

[57] ABSTRACT

Adhesion of metals to vulcanizable elastomers is promoted by a process of incorporating into the elastomer and organo-nickel salt and then vulcanizing the elastomeric composition while it is in contact with the metal surface.

8 Claims, No Drawings

ORGANO-NICKEL SALTS AS ADHESION PROMOTORS FOR VULCANIZABLE ELASTOMERS TO METALS

DETAILED DESCRIPTION

This invention relates to the bonding of vulcanizable elastomeric compositions to metals.

In the production of rubber articles, such as, for example, pneumatic tires, belts, conveyer belts provided with reinforcing metallic elements, tubes provided with reinforcing cords or wires, and, in general, in the production of all rubber articles in which rubber is reinforced with metal, it is necessary to obtain between the metal and the elastomeric composition a strong and durable bond in order to ensure a good efficiency and a long life for the articles produced.

It has now been unexpectedly found that unusually good bonds are produced between vulcanizable elastomeric compositions and metals when there is added to the vulcanizable elastomeric composition a compound of the generic formula (Organic Ligand) Nickel(Anion)   I wherein the organic ligand is represented by one of the following generic formulas and the anion is represented by one of the following generic formulas or is an inorganic ion:

1. 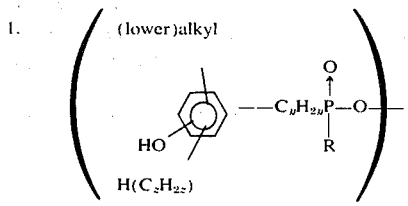   A wherein R is an alkyl, cycloalkyl or aryl hydrocarbon group of 12 or less carbon atoms, $z$ has a value of from 0 to 6, and $y$ has a value from 1 to 4, or 2. 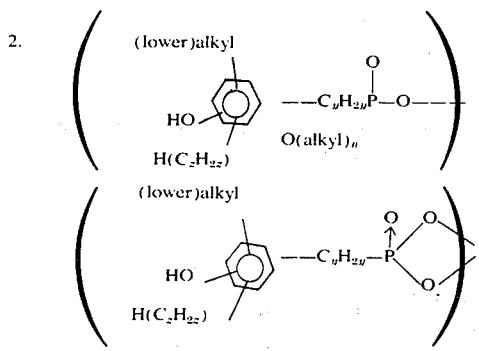   B

B′ wherein $z$ has a value of from 0 to 6, $y$ has a value of from 0 to 4 and $n$ has a value of from 0 to 1, or 3. 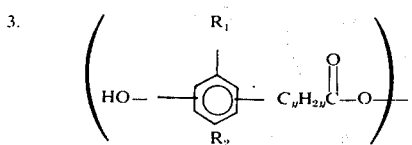   C wherein $R_1$ and $R_2$ are independently of one another alkyl groups having from 0 to 6 carbon atoms and $y$ has a value of from 0 to 4, or 4.  (RCO$_2$+)   D wherein R is an organic anion derived from carboxylic acids containing from 1 to 30 carbon atoms, preferably 2 to 18 carbon atoms, e.g., acetoxy, lauroyloxy, stearoyloxy, benzoyloxy, malonoyloxy, succinoyloxy, and the like; phenoxy including alkylphenoxy; alkyl and arylsulfates and -sulfonates; or 5. 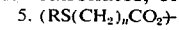 (RS(CH$_2$)$_n$CO$_2$+)   E wherein R is alkyl, monoalkylaryl or polyalkyl aryl containing from 4 to 24 carbon atoms, alkyl with a thioether linkage or a group of the formula

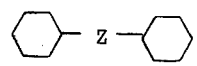

wherein Z is oxygen, sulfur or the direct bond and $n$ has a value of 1 or 2, or

[structure F]

F wherein $R_1$ and $R_2$ independently of one another are hydrogen, alkyl, aryl, or the substituents N(R) (R) form part of a heterocyclic ring.

The compounds of formula I above containing the organic ligand described by formula A are prepared according to procedures described in U.S. Pat. No. 3,488,368.

The nickel is present in a free valence state or may be present in a metal complex in which part but not all of the free valence state of the metal is satisfied by one or more organic or inorganic anions. Illustrative of such organic anions are the acyloxy group derived from carboxylic acids containing from 1 to 30 carbon atoms, preferably 2 to 18 carbon atoms, e.g., acetoxy, lauroyloxy, stearoyloxy, benzoyloxy, malonoyloxy, succinoyloxy, and the like; phenoxy including alkylphenoxy; alkyl- and arylsulfates and -sulfonates; alkyl- and arylphosphates and -phosphonates and the like. Suitable inorganic anions include chlorides, bromides, iodide, fluoride, nitrate, cyanide, cyanate, thiocyanate, sulfate and the like.

The phenylalkyl group of the phosphinic acid moiety is substituted in the aromatic ring by a hydroxy group and one ($z=0$) or two ($z=1$ to 6) (lower)alkyl groups. These substituents may be located on the phenylalkyl group in a number of ways. It is generally desirable to utilize a 3,5-dialkyl-4-hydroxyphenylalkyl arrangement, e.g., 3,5-di-t-butyl-4-hydroxybenzylphosphinate. However, other arrangements such as 2-hydroxy-5-(lower)alkylphenylalkyl are also within the scope of the present invention.

The alkylhydroxyphenyl group is linked to the phosphinic acid group through a straight or branched chained alkylene group of from 1 to 4 carbon atoms, the number of carbon atoms being shown by the designation $y$.

In addition to the alkylhydroxyphenylalkyl group, the phosphorus atom of the phosphinic acid group bears a hydrocarbon group of from 1 to 12 carbon atoms. This hydrocarbon group may be an aliphatic hydrocarbon group, notably alkyl and preferably (lower) alkyl, a cycloalkyl group, such as cyclopentyl, or cyclohexyl, or an aryl group such as phenyl, naphthyl, xylyl, and the like.

By the term "alkyl," when used in this specification is intended a branched or straight chained saturated hydrocarbon group having from 1 to 12 carbon atoms. When qualified by the term "lower," the hydrocarbon chain will contain from about 1 to about 6 carbon atoms. Typical of such alkyl groups are thus methyl, ethyl, propyl, isopropyl, butyl, t-butyl, pentyl, isopentyl, hexyl, octyl, t-octyl, decyl, dodecyl, and the like.

A particularly useful subclass of the present invention are those compounds of the formula

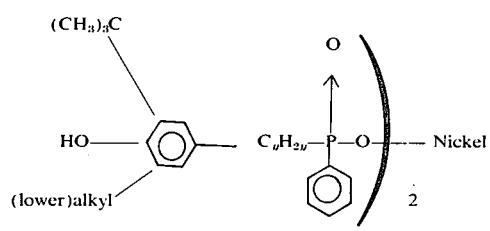

wherein $n$ and $y$ are previously defined, especially those compounds in which $y$ is 1.

Illustrative of the compounds usable in the present invention are the following compounds of formula I having organic ligand A:

nickel bis-{(3,5-di-t-butyl-4-hydroxybenzyl)-benzenephosphinate} nickel {(3,5-di-t-butyl-4-hydroxybenzyl) benzenephosphinate}acetate nickel { bis-( 2-(3,5-di-t-butyl-4-hydroxyphenyl) ethyl}benzenephosphinate)

nickel bis-({2-(3,5-di-t-butyl-4-hydroxyphenyl) ethyl}ethanephosphinate)

nickel bis-{(3,5-di-t-butyl-4-hydroxybenzyl) cyclohexanephosphinate}.

The compounds of formula I above containing the organic ligand described by formula B are prepared according to procedures described in U.S. Pat. No. 3,310,575.

The available valence bonds of the metal will be satisfied by one or more phosphonate or O-alkyl phosphonate groups and, if needed, by anions, organic or inorganic. The anion may be organic or inorganic. Illustrative of such organic anions are carboxylate, such as those derived from carboxylic acids containing from 1 to 30 carbon atoms, preferably 2 to 18 carbon atoms, e.g., acetate, laurate, stearate, benzoate, malonate, maleate, succinate, and the like; phenates and alkyl substituted phenates; alkyl- and aryl-sulfates and -sulfonates; alkyl- and aryl-phosphates and -phosphonates; and inorganic anions such as chloride, bromide, iodide, fluoride, nitrate, cyanide, cyanate, thiocyanate, sulfate, and the like.

The term "alkyl" is intended a branched or straight chained saturated hydrocarbon group having from 1 to about 30 carbon atoms. When qualified by the term "lower," the hydrocarbon chain will contain from 1 to about 6 carbon atoms. Typical of such alkyl groups are thus methyl, ethyl, propyl, isopropyl, butyl, t-butyl, pentyl, isopentyl, hexyl, octyl, t-octyl, decyl, tetradecyl, hexadecyl, octadecyl, eicosyl, docosyl, triacontyl and the like.

The phenyl group of phosphonate moiety is substituted by a hydroxy group and one ($z=0$) or two ($z=1$ to 6) (lower)alkyl groups. These substituents may be located on the phenyl group in a number of ways. It is desirable to utilize a 3,5-dialkyl-4-hydroxyphenyl arrangement, e.g., 3,5-di-t-butyl-4-hydroxybenzylphosphonate. However, other arrangements such as 2-hydroxy-4-(lower)alkylphenyl are also within the scope of the present invention.

The following formulae, in which R represents the group

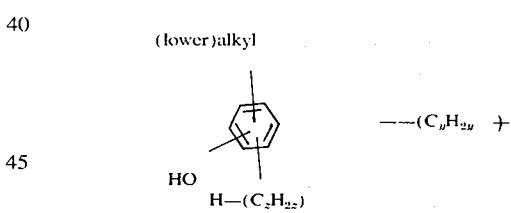

are typical structures of the compounds of this invention without being a limitation thereof:

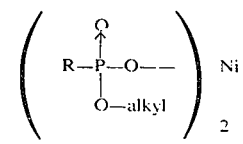

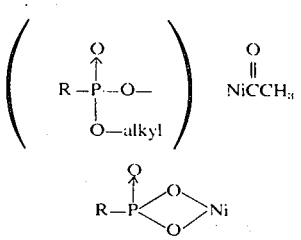

Illustrative of the compounds usable in the present invention are the following compounds of formula I having organic ligand B:

nickel bis(o-butyl 3,5-di-t-butyl-4-hydroxybenzylphosphonate)
nickel 3,5-di-t-butyl-4-hydroxybenzylphosphonate
nickel bis(o-octadecyl 3,5-di-t-butyl-4-hydroxybenzylphoshponate)
nickel(3,5-di-t-butyl-4-hydroxybenzylphosphonate)acetate
nickel-(o-n-butyl-3,5-di-t-butyl-4-hydroxybenzylphosphonate)-chloride
di-nickel-bis-(o-n-butyl-3,5-di-t-butyl-4-hydroxybenzylphosphonate)sulfate.

The compounds of Formula I above containing the organic ligand described by formula C are prepared according to procedures described in U.S. Pat. No. 3,189,630 for the nickel benzoates and analogously to procedures described in U.S. Pat. No. 3,723,489 for the nickel phenylalkanoate compounds.

Illustrative of the compounds usable in the present invention are the following compounds of formula I having organic ligand C:

nickel bis(3,5-di-tert-butyl-4-hydroxybenzoate)
nickel bis{3-(3,5-di-tert-butyl-4-hydroxyphenyl) propionate}.

The compounds of formula I above containing the organic ligand described by formula D are known commercially available compounds. Illustrative of the compounds usable in the present invention are the following compounds of formula I having organic ligand D:

nickel acetate
nickel benzoate
nickel caprylate
nickel citrate
nickel cyclohexanebutyrate
nickel 2-ethylhexoate
nickel naphthenate
nickel neodecanate e
nickel octoate
nickel oleate
nickel propionate
nickel stearate
nickel toluate.

The compounds of formula I above containing the organic ligand described by formula E are prepared according to procedures described in Belgium Pat. No. 754,891.

Illustrative of the compounds usable in the present invention are the following compounds of formula I having organic ligand E:

nickel n-octylthioacetate
nickel n-hexadecylthioacetate
nickel n-octadecylthioacetate
nickel p-tert-butylphenylthioacetate
nickel n-butylthiopropionate
nickel n-dodecylthiopropionate
nickel tert-dodecylthiopropionate
nickel p-tert-butylphenylthiopropionate.

The compounds of formula I above containing the organic ligand described by formula F are prepared according to procedures described in British Pat. No. 943,081.

Illustrative of the compounds usable in the present invention are the following compounds of formula I having organic ligand F:

{2,2'-thiobis(4-t-octylphenolato)}n-butylamine nickel (II)
{2,2'-thiobis(4-t-octylphenolato)}n-dodecylamine nickel (II)
{2,2'-thiobis(4-t-octylphenolato)}phenylamine nickel (II)
{2,2'-thiobis(4-t-octylphenolato)}morpholine nickel (II)
{2,2'-thiobis(4-t-octylphenolato)}hexamethylenimine nickel (II).

According to the present invention therefore, there is provided a method of bonding a vulcanizable elastomeric composition to a metal surface during vulcanization which comprises adding to a vulcanizable elastomeric composition a compound of formula I in an amount of from 0.05 phr to 10 phr by weight based on the weight of the elastomer, and preferably from 0.1 to 5.0 phr, and vulcanizing the composition while it is in contact with the metal surface to provide a strong and durable bond. According to the present invention, there is also provided a composition which comprises an unsaturated vulcanizable elastomer, a vulcanizing agent, and a compound of formula I in an amount of from 0.05 phr to 10 phr by weight based on the weight of the elastomer, and preferably from 0.10 to 5.0 phr.

The unsaturated vulcanizable elastomeric composition may be produced by mixing the ingredients of the composition in the normal manner in an internal mixer, for example, a Banbury mixer, an extruder and/or on a two-roll mill. After mixing, the composition may be applied to a metal surface and vulcanized. After application to the metal surface, the composition is normally vulcanized at a temperature of from 140°C to 180°C. The time of vulcanization may be varied according to the vulcanization temperature and the properties desired in the vulcanizate, as is known in the art. Generally, as the vulcanization time is increased, the bond strength increases. There is further provided a product of the method described in this paragraph.

The compounds of formula I can be used with any vulcanizable elastomer. All natural and/or synthetic rubbers are usable in the present invention. Such elastomers include polydienes such as polybutadiene or polyisoprene, including natural rubber; copolymers of dienes such as butadiene or isoprene with other copolymerizable monomers such as styrene, alpha-methylstyrene, an acrylic ester, methylisopropenylketone, isobutylene, acrylonitrile or an unsaturated carboxylic acid; halogenated rubbers such as polychloroprene or fluororubbers; interpolymers of one or more monolefins with a monomer which confers unsaturation on the interpolymer for example an unsaturated ethylene/propylene interpolymer such as an ethylene/propylene/dicyclopentadiene terpolymer; sulphur-vulcanizable polyurethane rubbers; butyl rubber containing at least 0.8% unsaturation; and combinations of the above elastomers, e.g., natural rubber/butadiene-styrene copolymer blends, a mixture of a saturated copolymer of ethylene and propylene with an unsaturated interpolymer of ethylene, propylene and a monomer comprising unsaturation in the interpolymer, etc.

In addition to the compounds defined by formula I, the compositions of this invention may contain other conventional additives including accelerators, activators, anti-cracking agents, antioxidants, antiozonants, anti-scorching agents, antistatic agents, dispersing agents, extenders, fillers, internal lubricants, plastic softeners, processing aids, retardars, tackifiers, vulcanizing agents, pigments, etc. These conventional ingredients and additives are added to the elastomeric material in suitable amounts in known manners to produce a vulcanizable composition based on the selected elastomer.

The vulcanizable compositions which may be bonded by the method of the present invention will preferably contain carbon black. The amount of carbon black included will depend upon the desired nature of the product. Since, although the hardness is increased by increased amounts of carbon black, the resilience of the rubber, when vulcanized, is reduced. Preferably, however, the amount of carbon black in the rubber is from 25 to 80 parts by weight of carbon black per 100 parts by weight of the elastomer in the compositions.

The use of sulphur as vulcanizing agents is preferred, since this ingredient is known to be capable of facilitating the bonding between the elastomeric composition and metals, and in particular, brass or zinc slated metals. The amount of sulphur in the synthetic rubber composition may be from 0.1 to 25 parts by weight, preferably from 0.5 to 10 parts by weight, per 100 parts by weight of the vulcanizable elastomer.

Examples of accelerators useful in the invention are mercaptobenzothiazole or N-cyclohexylbenzothiazole-2-sulpheneamide which may be present in an amount of, for example, from 0.1 to 6.0 parts by weight per 100 parts by weight of the elastomer.

The metals to which the elastomeric composition is to be bonded include iron, steel, cobalt, nickel, copper, zinc, titanium, vanadium, chromium, tin and mixtures of the above, more specifically brass and bronze. The preferred metals of this invention are steel or brass, bronze or zinc plated metals. It is not necessary for the surface of the metal to be roughened before the composition is applied since the bond between the composition and the metal is not a mechanical one. However, it is preferred to free the metal surface of grease and dirt before the composition is applied.

The following examples, presented for illustration and not limitation, will further serve to typify the nature of the present invention.

EXAMPLE 1
Bonding of Natural Rubber to Brass Plated Steel Wire a. Preparation of Natural Rubber Stock One hundred parts of natural rubber (SMR5L) were placed in a size B Banbury Mixer preheated to about 110°F and having a rotor speed of 116 rpm. After 0.5 minutes of mixing, 1.00 part stearic acid plus 5.00 parts of tackifier (Piccovar 420) were added. After mixing for an additional minute, 50.00 parts of carbon black (Continex FEF (N-550)) were added in two equal portions were added after 1.5 and 2.5 minutes of total mixing time, respectively. Zinc oxide, 1.00 part was added after 3.5 minutes of total mixing time and the mix was swept down after 4.5 minutes of total mixing time. After mixing for an additional 1.5 minutes to make a total of 6 minutes, the entire mix was dumped at a temperature of about 320°F.

b. Sample Preparation

The stock obtained after Banbury mixing was cut into smaller samples, ranging in size from 50 to 100 grams which were subsequently milled on a two-roll mill at 160°F for 7 minutes, during which time 2.00 parts of sulfur, 0.75 parts accelerator (SANTOCURE NS) and either 1.60 or 1.00 parts of the organo-nickel salt were added. After 7 minutes of milling, the stock was sheeted.

The sheeted stock was cut into 0.5 × 8.0 inch strips and stacked to form two strips each weighing approximately 16 grams. The strips were freshened (lightly washed) with n-hexane prior to being placed in a curing mold.

The mold was preheated in a hydraulic compression press maintained at 290°F for a minimum of 3 minutes. The mold was removed from the press, and loaded according to the following sequence: brass support plate (8 × 0.5 × 0.062 inch), rubber strip, brass plated steel wire sample, rubber strip, brass support plate and top plate of mold. The sample was cured for 23 minutes at 290°F under a ram force of 23,000 pounds. After the 23 minute curing time, the mold was removed from the press and the rubber sample containing both the support plates and wire was removed from the mold and allowed to cool to ambient temperature (72°F).

A description of the above sample preparation procedure is found in ASTM Test D2229-68.

c. Testing Method

After standing at ambient temperature for 18 to 24 hours, the wires were pulled from the rubber stock using an Instron Testing machine, in accordance with the testing procedure set forth in ASTM test 2229-68, but with the modifications described in A. E. Hicks, et al. in *Rubber Chemistry and Technology*, 45, 26–48 (1972).

d. Test Results

Listed in Table I are the test results obtained according to the procedure outlined above.

TABLE I

| Organic Ligand | Rubber Stock No. | Additive Concentration | Pull-Out Force (lbs/0.5 in. of rubber) | Adhesion[1] Factor |
|---|---|---|---|---|
| 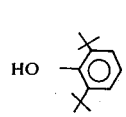 | 4 | 1.0 | 39 | 1.8 |
| 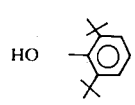 | 4 | 1.0 | 27 | 1.3 |
| 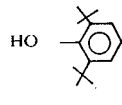 | 2 | 1.6 | 50 | 2.4 |

TABLE I -Continued

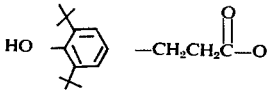

| Organic Ligand | Rubber Stock No. | Additive Concentration | Pull-Out Force | Adhesion[1] Factor |
|---|---|---|---|---|
| $H_{35}C_{17}C(=O)-O-$ | 5 | 1.6 | 27 | 1.3 |
| $HO-C_6H_2(X)_2-CH_2CH_2C(=O)-O-$ | 2 | 1.6 | 29 | 1.4 |
| $H_{37}C_{18}SCH_2C(=O)O-$ | 5 | 1.6 | 25 | 1.2 |
| $H_{25}C_{12}SCH_2Ch_2C(=O)O-$ | 5 | 1.6 | 28 | 1.3 |
| Blank | 4 | | 22 | 1.0 |
| Blank | 2 | | 20 | 1.0 |
| Blank | 5 | | 21 | 1.0 |

[1] $\frac{\text{Pull-Out Force For Additive Compound}}{\text{Pull-Out Force for Blank}} = \text{Adhesion Factor}$

EXAMPLE 2

Adhesion of Styrene-Butadiene Copolymer to Brass Plated Steel Wire a. Preparation of Styrene-Butadiene Copolymer Stock One hundred and fifty parts of a SMR Master-batch No.1605 (Ashland Chemical) containing 100.00 parts SBR and 50.00 parts carbon black FEF (N-550) were placed in a size B Branbury Mixer, initially heated to about 70°F and having a rotor speed of 116 rpm. After mixing for 0.5 minutes, 2.82 parts of zinc oxide and 0.71 parts of Age-Rite Resin D (antioxidant) were added and mixed for another minute. Stearic acid, 0.71 parts was then added and mixed for an additional 2.5 minutes, then swept down and the mixing continued for 2 more minutes for a total mixing time of 6 minutes, at which time the entire mix was dumped at a temperature of about 345°F.

b. Sample Preparation

The stock obtained after Banbury mixing was cut into smaller samples, ranging in size from 50 to 100 grams. These were subsequently milled on a two roll mill at 180°F for 7 minutes during which time 1.24 parts of sulfur, 0.64 parts of Santocure NS, 0.14 parts of tetramethylthiuram monosulfide and 1.00 parts of nickel bis(o-n-butyl-3,5-di-t-butyl-4-hydroxybenzylphosphonate) were added. After 7 minutes of milling, the stock was sheeted.

The sheeted stock was cut into 0.5 × 8.0 inch strips and stacked to form two strips each weighing approximately 16 grams. The strips were freshened (lightly washed) with n-hexane prior to being placed in the curing mold.

The mold was preheated in a hydraulic compression press maintained at 300°F for a minimum of 3 minutes. The mold was removed from the press and loaded according to the following sequence: brass support plate (8 × 0.5 × 0.062 inch), rubber strip, brass plated steel wire samples, rubber strip, brass support plate and top plate of mold. The sample was cured for 24 minutes at 300°F under a ram force of 23,000 pounds. After the 24 minutes curing time, the mold was removed from the press and the rubber sample containing both the support plate and wires were removed from the mold and allowed to cool to ambient temperature (72°F).

c. Test Method

After standing at ambient temperatures for 18 to 24 hours, the wires were pulled from the rubber stock using an Instron Testing machine according to ASTM Test 2229-68 but including the modifications described by A. E. Hicks, et al. in *Rubber Chemistry and Technology*, 45, 26–48 (1972).

d. Test Results

The average force required to pull the wire from 0.5 inches of rubber was 60 pounds while the average force required to pull the wire from a formulation containing all of the ingredients except the additive compound was 17 pounds.

EXAMPLE 3

Adhesion of Ethylene-Propylene Terpolymer (EPDM) Rubber to Brass Plated Steel Wire a. Preparation of EPDM Rubber Stock The EPDM Rubber Stock was prepared by placing 100.00 parts of EPDM rubber (EPSYN 40A from Copolymer) in a size B Banbury Mixer preheated to about 120°F and having a rotor speed of 116 rpm. After mixing for 0.5 minutes, 1.00 parts of stearic acid were added and mixed for another 0.5 minutes. One-half of 150.00 parts of carbon black FEF (N-550) was then added and mixed for an additional 0.5 minutes. Then the remaining one-half of the carbon black, 5.00 parts of zinc oxide and 100.00 parts of process oil (Flexon 580) were added, the stock was mixed for another 4.5 minutes and then dumped. The total mixing time was 6 minutes and the dump temperature was about 335°F.

b. Sample Preparation

The Banbury mixed stock was cut into smaller samples, ranging in size from 50 to 100 grams. These were milled on a two roll mill at 180°F for 7 minutes during which time 1.50 parts of sulfur, 1.50 parts of tetramethylthiuram monosulfide, 0.50 parts mercaptobenzothiazole and 1.60 parts of nickel bis(o-ethyl-3,5-di-t-butyl-4-hydroxybenzylphosphonate) were added. After 7 minutes of milling, the stock was sheeted.

The sheeted stock was cut into 0.5 × 8.0 inch strips and stacked to form two strips each weighing about 16 grams. The strips were freshened (lightly washed) with n-hexane prior to being placed in the curing mold.

The mold was preheated in a hydraulic compression press maintained at 300°F for a minimum of 3 minutes. The mold was removed from the press and loaded according to the following sequence: brass support plate (8 × 0.5 × 0.062 inch), rubber strip, brass plated steel wire samples, rubber strip, brass support plate and top plate of mold. The sample was cured for 32 minutes at 300°F under a ram force of 23,000 pounds. After the 32 minutes curing time, the mold was removed from the press and the rubber sample containing both the support plates and wires was removed from the mold and allowed to cool to ambient temperature (72°F).

c. Test Method

After standing at ambient temperature for 18 to 24 hours, the wires were pulled from the rubber stock using an Instron Testing machine according to Test 2229-68, but including the modifcations described by A. E. Hicks et al. in *Rubber Chemistry and Technology*, 45, 26–48 (1972).

d. Test Results

The average force required to pull the wire from 0.5 inches of rubber was 34 pounds while the average force to pull the wire from a formulation containing all of the ingredients except the additive compound was 3 pounds.

Similar test results are obtained when the following compounds are used in place of the above mentioned nickel bis(o-ethyl-3,5-di-t-butyl-4-hydroxybenzylphosphonate):

nickel bis(3,5-di-t-butyl-4-hydroxybenzoate)

{2,2'-thiobis(4-t-octylphenolato)} n-butylamine nickel     (II).

What is claimed is:

1. A method of improving adhesion between a vulcanizable elastomeric composition and a metal surface to provide a strong and durable bond, which method consists essentially of a. adding to a vulcanizable elastomeric composition from 0.05 phr to 10 phr by weight based on the weight of the elastomer of a compound of the generic formula (Organic Ligand) Nickel(Anion)     I wherein the organic ligand is represented by one of the following generic formulas and the anion is represented by one of the following generic formulas or is an inorganic anion:

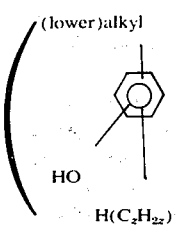

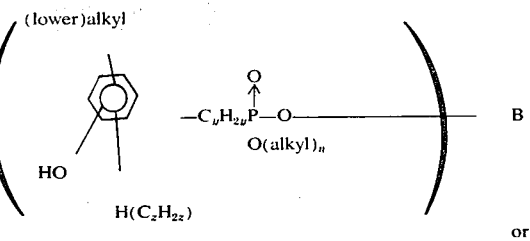

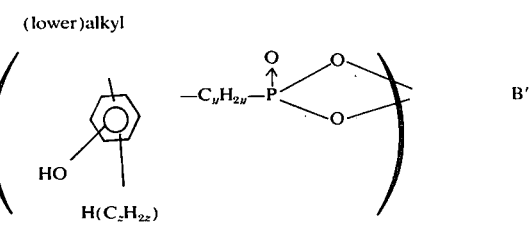

wherein $z$ has a value of from 0 to 6, $y$ has a value of from 0 to 4 and $n$ has a value of from 0 to 1, or

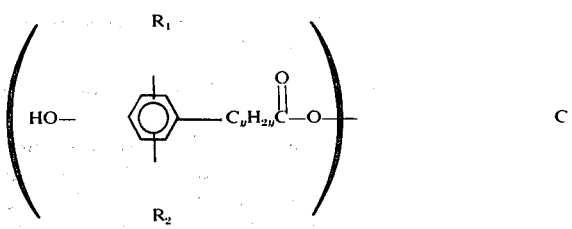

wherein $R_1$ and $R_2$ are independently of one another hydrogen or alkyl groups having from 1 to 6 carbon atoms and $y$ has a value of from 0 to 4, or $(RCO_2)$—     D wherein R is an organic anion derived from carboxylic acids containing from 1 to 30 carbon atoms; phenoxy including alkylphenoxy; alkyl and arylsulfates and -sulfonates; or $(RS(CH_2)_nCO_2)$—     E wherein R is alkyl, monoalkylaryl or polyalkyl aryl containing from 4 to 24 carbon atoms, alkyl with a thioether linkage or a group of the formula

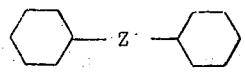

wherein Z is oxygen, sulfur or the direct bond and $n$ has a value of 1 or 2, or

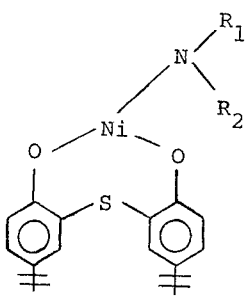

F wherein $R_1$ and $R_2$ independently of one another are hydrogen, alkyl, aryl, or the substituents $N(R)(R)$ form part of a heterocyclic ring, and b. vulcanizing the composition while it is in contact with the metal surface.

2. The method of claim 1 wherein the vulcanizable elastomer is selected from natural rubber, styrene-butadiene copolymer, or ethylene-propylene terpolymer.

3. The method of claim 1 wherein the compound of formula I is present in an amount of from 0.1 to 5.0 phr by weight, based on the weight of the elastomer.

4. The method of claim 1 wherein the elastomeric composition contains carbon black.

5. The method of claim 1 wherein the vulcanizing agent is sulfur.

6. The method of claim 1 wherein the vulcanizable elastomer is natural rubber, styrene-butadiene copolymer, or ethylene-propylene terpolymer and the compound of formula I has the organic ligand and anion both represented by formula B.

7. The method of claim 6 wherein the vulcanizable elastomer is natural rubber or styrene-butadiene copolymer and the compound of formula I has the formula

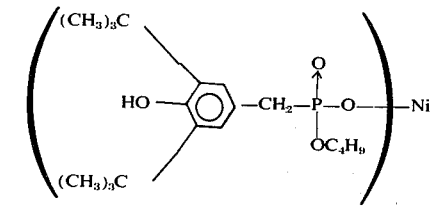

8. The method of claim 6 wherein the vulcanizable elastomer is natural rubber or ethylene-propylene terpolymer and the compound of formula I has the formula

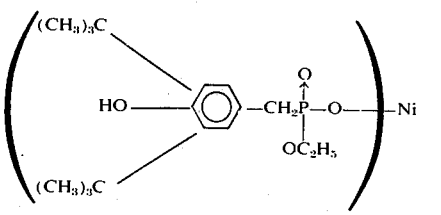

* * * * *